United States Patent [19]

Thomas

[11] Patent Number: 4,919,855
[45] Date of Patent: Apr. 24, 1990

[54] PROCESS FOR PRODUCING A BLOW-MOLDED CONTAINER

[75] Inventor: Alfred Thomas, Hennef-Dambroich, Fed. Rep. of Germany

[73] Assignee: Kautex Werke Reinold Hagen AG, Fed. Rep. of Germany

[21] Appl. No.: 184,515

[22] Filed: Apr. 21, 1988

[30] Foreign Application Priority Data

Sep. 4, 1987 [DE] Fed. Rep. of Germany ....... 3729571
Oct. 26, 1987 [DE] Fed. Rep. of Germany ....... 3736164

[51] Int. Cl.$^5$ ...................... B29C 49/04; B29C 49/78; B29C 49/80
[52] U.S. Cl. ........................................ 264/21; 73/104; 264/40.2; 264/515
[58] Field of Search ...................... 264/21, 40.1, 40.2, 264/171, 173, 209.1, 209.3, 510, 514, 515; 73/104

[56] References Cited

U.S. PATENT DOCUMENTS

| | | | |
|---|---|---|---|
| 3,097,058 | 7/1963 | Branscum et al. | 264/515 |
| 3,592,882 | 7/1971 | Morita | 264/1.6 |
| 3,974,248 | 8/1976 | Atkinson | 264/40.2 |
| 4,217,161 | 8/1980 | Yamada et al. | 264/510 X |
| 4,444,701 | 4/1984 | Meguiar | 264/40.1 |
| 4,477,521 | 10/1984 | Lehmann et al. | 264/171 X |
| 4,487,730 | 12/1984 | Larribe | 264/40.1 |
| 4,584,150 | 4/1986 | Ballocca | 264/40.1 |
| 4,643,785 | 2/1987 | Paynton | 264/40.2 X |
| 4,714,580 | 12/1987 | Maruhashi et al. | 264/515 X |

FOREIGN PATENT DOCUMENTS

| | | | |
|---|---|---|---|
| 116685 | 8/1984 | European Pat. Off. | 264/40.1 |
| 247480 | 12/1987 | European Pat. Off. | |
| 2819767 | 11/1978 | Fed. Rep. of Germany | 264/515 |
| 13747 | 12/1981 | Fed. Rep. of Germany | |

OTHER PUBLICATIONS

"Shopping a Show," *Modern Packaging*, pp. 34, 37 (Aug. 1975).

*Primary Examiner*—Jeffery Thurlow
*Assistant Examiner*—Leo B. Tentoni
*Attorney, Agent, or Firm*—Panitch, Schwarze, Jacobs & Nadel

[57] ABSTRACT

A process for the production of a laminate of thermoplastic material with a multi-layer wall by co-extrusion provides that added to the material for forming at least one of the layers of the laminate is a substance which makes it possible for that layer to be rendered recognizable in the laminate by the action of physical and/or chemical means. The added substance may be a fluorescing, phosphorescing or luminescing substance so that the layer containing that substance can be rendered visible in the wall of the laminate by the action of UV radiation of appropriate wavelength.

26 Claims, 1 Drawing Sheet

PROCESS FOR PRODUCING A BLOW-MOLDED CONTAINER

BACKGROUND OF THE INVENTION

Laminates which are produced by a co-extrusion process and which at least predominantly comprise thermoplastic material generally have at least over parts of their configuration at least three layers. Of those layers, at least one which serves as a support layer comprises thermoplastic material while at least one other layer of the laminate structure comprises a material which serves for producing a bonding action between the support layer and at least one further layer which in turn comprises a material having properties which differ from those of the material forming the support layer. Laminates of that nature, or end products which are produced therefrom, are employed predominantly for packaging purposes in which the properties of conventional plastic materials, more particularly for example polyolefins, do not meet all the requirements involved. A typical example is the permeability of polyolefins in relation to material to be packaged and/or the ambient medium around the package. Thus, the permeability of such materials may limit or hinder the use thereof as foils, liners or containers, for example as bottles, canisters, drugs, fuel tanks and the like. When using foils for packaging foodstuffs an important consideration for example may be that the packaging foils are impervious in relation to fats, aromatic substances or the like so that such substances which are part of the articles to be packaged in the foils do not diffuse through the foil to the exterior. If the foils were to be permeable to those and possibly other substances to be packaged therein, then the quality of the packaged material would alter in a disadvantageous fashion with the passage of time. For example in the case of bottles or like containers which are used for containing poisonous material or material which may have dangerous constituents, for example plant-protective agents, it is important for safety reasons to prevent the material contained in the bottles or like containers, or at least the dangerous constituents thereof, from diffusing through the material of the bottle or container, to the exterior. That consideration will apply in regard to a large number of chemicals which are packed in bottles and also canisters, drums or the like. When considering for example fuel tanks, a general requirement is that the walls thereof are not permeable in relation to hydrocarbons. In many cases however the problem may be that of preventing one or more substances from penetrating from the ambient atmosphere into the interior of packaging, a bottle, a container or the like, through the wall of the foil of the packaging or the wall of the bottle, container or the like. As a typical example in that respect, reference may be made to the requirement which is encountered in many situations of preventing oxygen in the air from diffusing through the foil of a package, the wall of a container or the like, into the interior thereof.

Although plastic materials are known which have such a low level of permeability for example in respect of gasoline and/or organic solvents that they do not exceed the permissible values, such plastic materials however tend to be expensive and/or cannot be readily processed. In many cases they also do not have the mechanical properties of for example polyolefins which make the latter suitable in respect of strength, toughness, elastic deformability and the like, precisely for use with materials whose transportation, storage and the like require certain precautions to be taken.

For the various reasons referred to above, foils, containers such as for example fuel tanks, and the like, are often produced in a multilayer or laminate construction, which involves at least one support layer of the laminate structure which generally comprises polyolefin being provided with a barrier layer which is more or less impermeable in relation to the material to be contained in the package or container, and/or the ambient medium. The barrier layer may for example comprise polyamide and the thickness thereof is generally substantially less than that of the one or more support layers. The barrier layer may be provided on the inward side and/or the outward side of the laminate structure. It is also possible however for the barrier layer to be arranged for example between two support layers, that is to say in a middle region of the cross-sectional configuration of the wall of the laminate structure. As however the different properties of the material forming the support layer on the one hand and the material forming the barrier layer on the other hand generally mean that it is not possible for the layers to be directly joined together in such a way that the joint therebetween is of adequate strength, an additional layer is often provided between the support layer and the barrier layer, the additional layer comprising another material which predominantly or exclusively is included to act as a bonding agent between the support layer and the barrier layer. The bonding agent layer must thus comprise a material which can form a bonding connection of adequate strength both to the material forming the support layer and also the material forming the barrier layer of the laminate structure. Although the bonding layer only has to perform an auxiliary function in the sense of producing a bond between the support layer and the barrier layer, nonetheless it is an aspect of crucial significance in regard to the mechanical strength of the end product made from the laminate, as if the bonding layer is incomplete, for example if it is missing in some parts of the laminate structure, that necessarily results in the mechanical strength of the end product being adversely affected as those parts of the laminate structure do not have a proper bond or only an incomplete bond, between the support layer and the barrier layer.

Both the barrier layer or layers and the bonding agent layer or layers are generally of small thickness. That is true in particular in respect of the layer or layers of bonding agent, the thickness of which may possibly be in the range of tenths of a millimeter, or even substantially less than that. Therefore, there is no guarantee under all the operating conditions which may arise in practical situations that those layers occur in the wall of the laminate foil or a hollow body or container produced therefrom, in a uniformly distributed configuration at all points where the presence thereof is required. As the endeavor, for reasons of economy, is to make the wall of the article produced from the laminate material and therewith also the individual layers forming the laminate structure, no thicker than is absolutely necessary, upper limits are set on the thickness of the individual layers making up the laminate. Accordingly, it is not reasonably possible totally to exclude the possibility that, on expansion or stretching of the foil or for example a preform for an article which is made from the laminate material, at least one of the layers of the laminate structure may be subjected to overstressing with the result that in the end product that layer is so incomplete or inadequate, in certain regions thereof, that it cannot perform the function for which it was intended.

Added to that is the fact that irregularities which are not visually perceptible may also occur in the process for forming the foil of laminate structure or a preform of laminate structure from which a hollow body such as a container or the like is to be produced, and possibly even when forming the individual layers forming the laminate structure, in an extrusion head. That may be the case in particular with foils and hollow bodies or preforms for producing same, which are produced in large quantities, for example on a mass-production scale. The production of such a foil or preform requires the use of a comparatively complicated piece of equipment comprising a plurality of extruders for plasticising the materials to be employed for the individual layers of the laminate structure, and a common extrusion head, into which the materials which have been plasticised in the individual extruders are passed in order to be brought together in the extrusion head and put into the required cross-sectional shape of the foil or the preform. In that situation also it is not possible completely to exclude the possibility that, even if only in exceptional cases, irregularities may occur in one layer or another of the laminate structure, which irregularities may possibly have the result, particularly in the case of layers which are in any case thin from the outset, that a layer is incomplete or is possibly even entirely missing, in a certain region of the foil or the preform produced in that fashion.

Generally speaking, defects or defective areas of that kind cannot be seen in the finished article, unless they occur in the outermost layer of the laminate structure thereof. However in normal circumstances that is fairly improbable as the outer layer or layers of a foil or hollow body is or are generally the above-mentioned load-carrying or support layer, or one thereof, which in any case is or are generally of greater thickness so that the occurrence of defects in such a layer is much less likely than in the case of the other layers, some of which are considerably thinner. Those layers which are thus at greater risk of being inadequate or defective are to be found predominantly in the interior of the wall structure of the laminate, that is to say between two other layers, so that they are not in any way accessibility from the outside. That applies in any event to the one or more layers of bonding agent as the only function thereof is to bond two other layers together so that a bonding agent layer necessarily always occurs between two other layers and is thus asked thereby on both sides. However, even the barrier layer which is intended to make the wall of the article impermeable is in many cases disposed between two other layers, generally two layers of bonding agent, so that it is also covered over thereby and is accordingly not accessible from the outside.

However, even if the barrier layer represents one of the outer layers of the wall structure of a hollow body of laminate nature, it is scarcely possible to perform a visual check in respect thereof as in such an arrangement the barrier layer generally forms the layer which defines the hollow interior of the hollow body and it is therefore not readily accessible. Added to that is the fact that an exclusively visual check is in any case extremely difficult to carry out, without additional aids for making any defects or defective areas visible. At any event, even if the layer to be checked were on the outside of an article formed by a laminate structure, visual checking would have to be carried out with an extremely high level of care in order satisfactorily to detect defects or defective areas. That applies even when, when considering a hollow body such as a container in which the barrier layer to be investigated is disposed on the inward side of the laminate structure thereof, as referred to above, samples of the hollow bodies were to be cut open in order to carry out sample testing thereof.

It has already been mentioned above that a satisfactory set of characteristics in respect of the laminate in the form of a foil or a container may be a matter of crucial significance, particularly when dealing with sensitive and/or dangerous materials to be packaged therein, in regard to the aspect of mechanical strength of the foil or container, not least also from the point of view of product liability. Undoubtedly it is a matter of disadvantage that multi-layer foils and containers or the like which are produced by a co-extrusion process can at present be checked visually or in some other fashion, only to a very incomplete and inadequate extent, in regard to their satisfactorily complying with the requirements made in respect thereof.

SUMMARY OF THE INVENTION

An object of the present invention is to provide a process for producing a laminate article by co-extrusion, such as to permit checking of the article in a comparatively simple fashion.

Another object of the present invention is to provide a process for producing a laminate article by co-extrusion, such as to permit checking of the article by non-destructive testing.

Still another object of the present invention is to provide a process for producing a laminate of at least predominantly thermoplastic material by a co-extrusion operation, which permits continuous checking of the articles produced thereby.

Yet another object of the present invention is to provide a laminate produced by a co-extrusion process, which lends itself to ready checking of the constitution of the laminate structure.

Yet a further object of the invention is to provide an article of laminate structure produced by a co-extrusion process, which can be readily checked for integrity of the laminate structure.

In accordance with the present invention, these and other objects are achieved by a process for producing a laminate which at least predominantly comprises thermoplastic material and which has a multilayer wall structure, by co-extrusion. In the process, the materials for forming the respective layers of the laminate structure are plasticised, for example in at least first and second extruders, and are then passed into a common injection head in which they are suitably brought together and from which the laminate is extruded. Added to the material for forming at least one of the layers of the laminate article is a substance which makes it possible for that layer to be detected in the multi-layer article produced by the extrusion operation, by the action of at least one chemical and/or physical means In terms of the laminate or laminate article, in accordance with the invention, the foregoing objects are achieved by a laminate which is produced by a co-extrusion process and which at least predominantly comprises thermoplastic material, wherein for test purposes at least one of the layers of the laminate structure includes at least one added substance having a fluorescing and/or luminescing and/or phosphorescing action, which under the effect of radiation applied thereto causes the layer or layers containing said substance or substances to be distinguishable from at least an adjacent layer.

In another aspect, a laminate article produced by co-extrusion and at least predominantly comprising thermoplastic material provides that at least one of the layers constituting the laminate structure of the article includes an added substance which under the action of another substance is adapted to react chemically therewith and to alter the layer containing the added substance, in a visually perceptible fashion.

An advantageous operating procedure in regard to an embodiment of the process of the invention is one in which a luminescing or fluorescing or phosphorescing substance is added to the material for forming at least one of the major layers of the laminate or preform and thus therewith the hollow body or like article to be produced therefrom. That added substance makes it possible for example to render visible in the finished product the layer which is formed from that material, under the effect of suitable radiation, such as UV-radiation, X-rays, electron beams, infra-red rays and the like. It is then readily possible to check visually or in some other fashion whether the layer which has been made perceptible in that way is actually to be found wherever it should be present. It is also possible to add luminescing, fluorescing, or phosphorescing substances of different natures to the respective materials to be used for providing two or more layers in the laminate structure, wherein the added substances are advantageously such that they cause different layers of the laminate structure to appear in different colors, possibly even when the incident radiation used is of the same wavelength. In that way it is possible to check more than one layer in a laminate structure without having to destroy the laminate article or in some other way have an adverse effect on its nature. The luminescing, fluorescing, or phosphorescing substance or substances may be added to the plastic material for forming the respective layer, in the form of what are known as light-emitting or radiant pigments. It is possible for example for such a pigment to be added to plastic granulate material before it is introduced into an extruder. The fluorescence colour can be determined by the chemical composition of the added substance. It is readily possible to make a plurality of layers in the laminate structure perceptible by means of suitable radiation, by means of a suitable selection in respect of the pigments added. In that connection, an aspect which may be of particular significance is that the amount of pigment or pigments to be added to the plastic material may be very small, for example of the order of magnitude of 0.001%, in order to achieve the desired effect.

The above-described embodiment of the invention is restricted to those laminates which comprise transparent or translucent material. If the outer layer or layers of the laminate wall structure or possibly also the layer to be tested is or are colored in such a way that the added pigments can no longer be detected in the above-described manner, then it is no longer possible to carry out the test in the fashion described. However the process according to the invention may nonetheless be used in that situation, even if in less complete form, for example by adopting a procedure whereby firstly samples of a given laminate to be produced, for example a foil or a hollow body, are produced, using materials which are not colored, and then, by means of such samples, the composition and the structure of the wall of such a foil or article are optimized, whereupon series production of the colored articles can be set up on the basis of the knowledge and experience obtained from the samples.

Detection of the respective layer in question may be effected by viewing the article with the human eye, but also using suitable physical means, the operative range of which lies outside the range of perception of the human eye.

A similar consideration also applies in regard to a modified form of the invention in which added to the material for forming at least one of the layers of the laminate structure is a substance which, when it comes into contact with another suitably selected substance, gives rise to a possibly reversible change, for example a change in color in the layer containing the added substance. That embodiment is particularly advantageous in regard to carrying out random sample testing in particular in respect of containers and other hollow bodies in which the two outer layers of the laminate structure, defining the inside and outside surfaces of the container or like body, are to be tested in respect of satisfactory nature and in particular in respect of completeness and integrity. For example if the article to be tested is a container, the container could be flushed out with a liquid containing the substance for producing the change in the layer of the laminate structure to be examined, if that layer is the inner layer of the wall structure of the laminate and therefore defines the interior of the container, so that it comes into contact with the material to be stored or packaged in the container. It will be appreciated however that generally speaking that form of the invention will be limited to carrying out random sample testing or to optimizing a given container in preparation for the production thereof on the basis of samples.

Further objects, features and advantages of the invention will be apparent from the following description of a preferred embodiment.

DESCRIPTION OF THE PREFERRED EMBODIMENT

Figure 2:
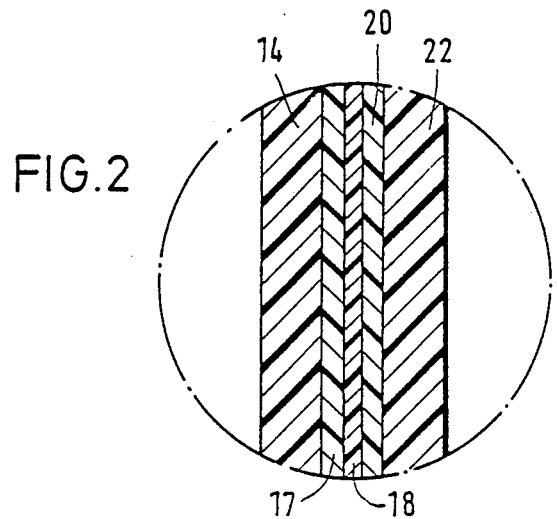
FIG. 2 shows a view in longitudinal section and on a larger scale of the region indicated by II in FIG. 1.

Referring now to the drawing, and more specifically FIG. 2 thereof, the illustrated laminate article in the form of a bottle as indicated generally at 12 comprises a wall 10 which is made up of five layers. Of those layers, the outward layer 14 and the inward layer 22 essentially provide the required mechanical strength for the bottle 12. The two layers 14 and 22 may comprise for example a polyolefin material.

The layer 18 comprises a material which has a barrier action in such a way as to prevent components of the material contained in the bottle 12 from diffusing through the wall thereof. If the material for the barrier layer 18 is suitably selected, it is also possible to prevent for example oxygen in the air from diffusing through the wall of the bottle into the interior thereof.

The material forming the barrier, layer 18 normally cannot form a strong and durable connection to the materials forming the layers 14 and 22. For that reason, it is necessary to provide on each side of the barrier layer 18 a respective layer as indicated at 17 and 20, comprising a material acting as a bonding agent, that is to say, which forms a sufficiently strong connection both to the materials forming the respective layers 14 and 22, and also to the material forming the barrier layer 18. If the bottle 12 is to be used for example for packaging corrosive material or material containing highly volatile constituents, it is therefore a matter of crucial significance that the barrier layer should actually be present in all the regions of the bottle 12 at which it is intended to be so present.

When producing the illustrated article or bottle 12 in accordance with the teachings of the present invention, it would be possible for example to carry out the production process with the inclusion of a step of adding to the material for forming the barrier layer 18, a substance which makes it possible for that layer to be made detectable in the multi-layer or laminate article, by the action of at least one chemical and/or physical means. For example, it would be possible to add to the material for forming the barrier layer 18 a fluorescing or luminescing or phosphorescing substance which is rendered visible in the bottle 12 by being subjected to appropriate radiation, for example UV-radiation. Thus, the substance for making the layer detectable may be added to the material for forming that layer in the course of the process for producing the laminate article which, as noted, at least predominantly comprises thermoplastic material, by co-extrusion, wherein the materials for forming the respective layers of the laminate are first plasticized for example in at least first and second extruders and then passed into a common extrusion head in which they are combined together and from which the laminate material is then extruded.

A similar procedure may also be followed in regard to the layers 17 and 20 of bonding agent. An adequate level of mechanical strength for the container or bottle 12 also presupposes that the bonding layers 17 and 20 are actually to be found, of adequate thickness, at all the locations at which the barrier layer 18 is provided, as if that is not the case, that is no guarantee that a suitable bond would be formed between the barrier layer 18 and the outer layer 14 on the one hand and the inner layer 22 on the other hand.

For the avoidance of misunderstanding, it should be noted that the view in FIG. 2 does not reproduce the thicknesses of the respective layers on their true scale. In practice the layers 17, 18 and 20 will be quite considerably thinner than in the view shown in FIG. 2.

If, in a departure from the construction shown in FIG. 2, the barrier layer is arranged at the inward side, that is to say it occupies the position occupied by the layer 22 in the bottle 12 shown in FIG. 2, it is possible in that case to add to the material for forming the barrier layer a substance which is such that, upon reacting with another substance, in the above-described manner, produces for example a change in the color of the layer in order thereby to indicate whether the layer in question is actually present at all points at which it should be present, while being of adequate thickness.

It should be appreciated that it is also possible to test for the presence of the main load-carrying or support layers in the above-described manner. In general however that will not be necessary as such layer or layers is or are from the outset of such a thickness as to exclude the risk of defective areas therein, for example due to such layer or layers being missing in the areas in question.

It will also be appreciated that the laminate structure shown in section in FIG. 2 is only given by way of example and a different structure and a different number of layers may be employed.

Figure 1:
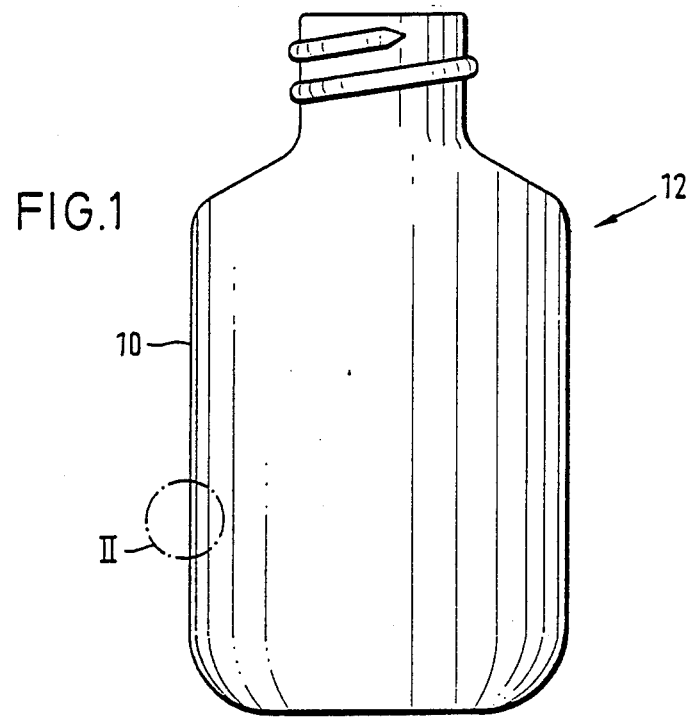
FIG. 1 is a view of a bottle produced by a co-extrusion blowing process, with a multi-layer wall configuration.

The foregoing description set forth in relation to the bottle 12 illustrated in FIGS. 1 and 2 also applies in corresponding fashion in regard to a foil, that is to say a flat laminate article. The foil could be for example of a similar structure to the structure shown in section in FIG. 2. The essential difference between a foil on the one hand and a hollow body such as a container or bottle on the other hand is that testing is carried out in a different fashion. Foils are flat articles which generally speaking are of greater longitudinal extent, while being of substantially smaller width, being therefore in the form of a web. In that connection it is desirably appropriate for such web material to be passed continuously through a testing apparatus in which the foil is subjected to the effect of appropriate radiation and moves past recording instruments which detect any defects and suitably draw attention thereto. Such an operating procedure may also be used in relation to tubular foils. On the other hand bottles or like containers or other hollow bodies of that nature will have to be tested individually, which however does not exclude continuously passing a row of bottles through a testing device. However, possibly depending on the shape of the article in question, it may be necessary for them to be rotated or curved in some other fashion in the testing device in order to bring all parts of the article into the area covered by the respective radiation and also the recording device involved.

It will be seen that in any event the present invention provides a substantial improvement in regard to the present state of such matters especially as the level of expenditure required for carrying the invention into effect is not very significant. As the layers of the laminate structure to be tested are quite predominantly disposed in the interior of the laminate structure, the added light-emitting pigments for example do not come into contact with the material to be packaged, if that aspect should be an important consideration in any way. However, taking such pigments which are available at the present time, it is also readily possible to select those which are unobjectionable even if the material to be packaged in for example a foil is a food.

It will be appreciated that the above-described embodiments of the process and the article in accordance with the present invention have been set forth solely by way of example and illustration of the invention and that various alterations and modifications may be made therein without thereby departing from the spirit and scope of the invention.

What is claimed is:

1. In a process for producing a hollow, blow-molded container having at least one wall portion which is a co-extruded, multilayer laminate of at least predominantly thermoplastic materials and in which at least one layer of said multilayer laminate must have integrity throughout said one layer, comprising first plasticizing the materials for forming the respective layers of the laminate in at least first and second extruders, passing the materials into a common extrusion head in which they are combined and from which the laminate is extruded, and blow molding the laminate to form said hollow container, the improvement comprising adding to the material from which said at least one layer is formed a substance which makes it possible for the integrity of said at least one layer in said container to be detected by at least one detection means which interacts with said substance.

2. A process according to claim 1 wherein said substance added to said material for forming said at least one layer is adapted to make said layer visible in said container by means of suitable radiation.

3. A process according to claim 2 wherein said added substance is a fluorescing substance.

4. A process according to claim 2 wherein said added substance is a luminescing substance.

5. A process according to claim 2 wherein said added substance is a phosphorescing substance.

6. A process according to claim 2 comprising adding to each of the materials for forming at least first and second layers of said laminate at least one respective substance selected from the group consisting of fluorescing, luminescing and phosphorescing substances, said at least two substances added to the respective materials behaving differently under the effect of appropriate radiation.

7. A process according to claim 6 wherein said different behavior of said substances involves different coloration of said layers when said laminate is subjected to said detection means.

8. A process according to claim 1 wherein said added substance results in coloration of the layer containing said substance when said substance is subjected to chemical detection means.

9. A process according to claim 1 wherein said laminate is at least translucent.

10. A method according to claim 1 wherein said at least one layer is an interior layer of said container.

11. A method of detecting the integrity of at least one layer in a hollow, blow-molded container having at least one wall portion formed of a co-extruded multilayer laminate of predominantly thermoplastic materials, comprising adding to the material from which said at least one layer is formed a substance which makes it possible to detect said one layer in the multilayer laminate, and subjected said laminate to at least one detection means and which will interact with said substance to detect the integrity of said material throughout said at least one layer.

12. A method according to claim 11 wherein said container is a storage container.

13. A method according to claim 11 wherein said container is a transporting container.

14. A method according to claim 11 wherein said detection means comprises means for chemically detecting said substance.

15. A method according to claim 11 wherein said detection means comprises means for physically detecting said substance.

16. A method according to claim 11 wherein at least one layer of said laminate comprises a barrier material which is less permeable to a substance to be contained in said container than at least one layer of said laminate, and said barrier material contains a substance which makes it possible to detect the integrity of the barrier material throughout said layer.

17. A method according to claim 11 wherein at least one other layer of the laminate comprises a polyolefin which contains no substance for checking the integrity of said other layer.

18. A method according to claim 11 wherein said at least one layer is positioned between at least two other layers so that said at least one layer is inaccessible from the outside without destroying the laminate.

19. A method according to claim 18 wherein said at least one layer comprises a bonding material.

20. A method according to claim 11 wherein at least two layers contain substances which behave differently when interacted with said detection means so that the integrity of the material of each layer may be detected throughout each respective layer.

21. A method according to claim 20 wherein at least one of said at least two layers is a barrier layer and at least one of said at least two layers is a bonding layer.

22. A method according to claim 20 wherein said different behavior of said substances involves different coloration of said layers when said laminate is subjected to said detection means.

23. A method according to claim 11 wherein said container is a fuel tank.

24. A method according to claim 11 wherein said laminate is at least translucent.

25. A method according to claim 11 wherein said at least one layer is an interior layer of said container.

26. A method according to claim 11 wherein said at least one layer is a barrier layer which forms the inner layer of the container wall.

* * * * *